No. 817,529. PATENTED APR. 10, 1906.
G. SLOAN.
LUBRICATOR.
APPLICATION FILED SEPT. 19, 1905.
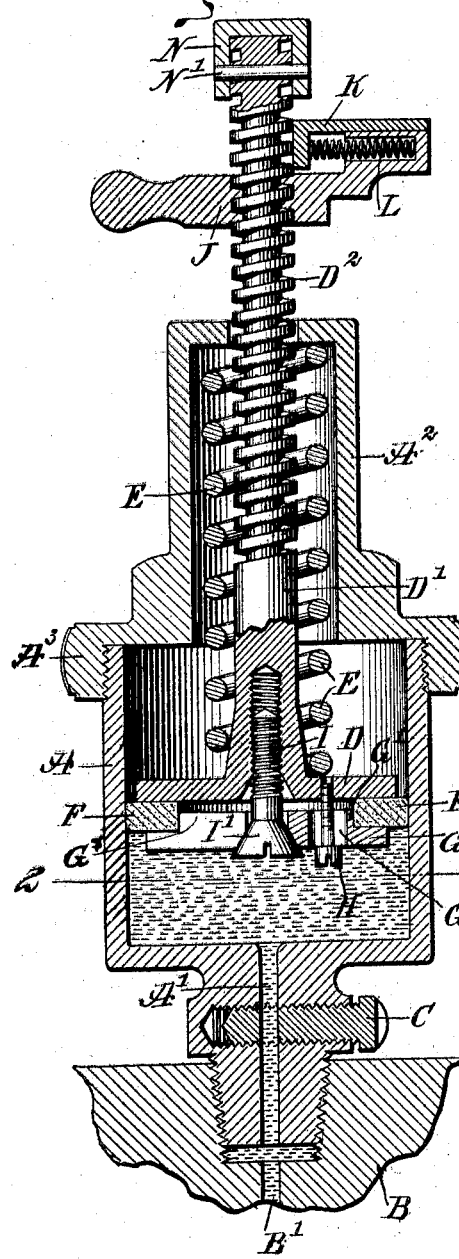
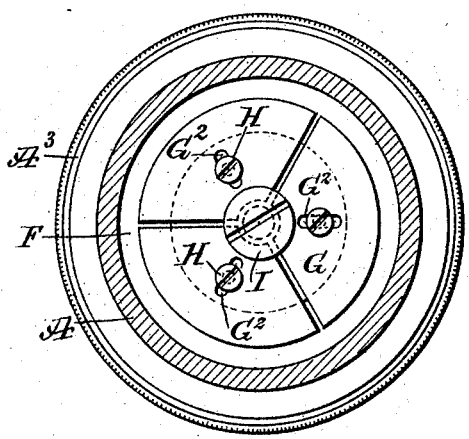
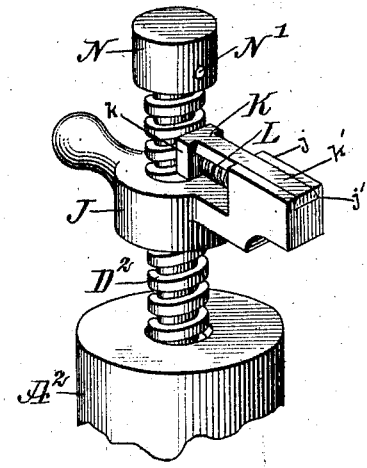
WITNESSES:
INVENTOR
George Sloan
BY
ATTORNEYS

UNITED STATES PATENT OFFICE.

GEORGE SLOAN, OF NORTH YAKIMA, WASHINGTON.

LUBRICATOR.

No. 817,529. Specification of Letters Patent. Patented April 10, 1906.

Application filed September 19, 1905. Serial No. 279,087.

*To all whom it may concern:*

Be it known that I, GEORGE SLOAN, a citizen of the United States, and a resident of North Yakima, in the county of Yakima and State of Washington, have invented a new and Improved Lubricator, of which the following is a full, clear, and exact description.

The invention relates to lubricators in which a spring-pressed plunger forces a turgid lubricant or grease to the part to be lubricated.

The object of the invention is to provide a new and improved lubricator arranged to insure a constant feed of the grease to the part to be lubricated and without danger of leakage of the grease past the spring-actuated plunger.

The invention consists of novel features and parts and combinations of the same, which will be more fully described hereinafter and then pointed out in the claim.

A practical embodiment of the invention is represented in the accompanying drawings, forming a part of this specification, in which similar characters of reference indicate corresponding parts in all the views.

Figure 1 is a sectional side elevation of the improvement. Fig. 2 is an inverted sectional plan view of the same on the line 2 2 of Fig. 1, and Fig. 3 is a perspective view of the device for raising and holding the plunger against the tension of its spring.

The vessel A for containing the grease or other lubricant is provided in its bottom with a feed-passage A', leading to the passage B' in the part B to be lubricated, and the amount of lubricant passing through said feed-passage A' is regulated by a suitable valve C, preferably in the form of a screw-valve having an aperture adapted to fully or partly register with the passage A'. Within the vessel A is mounted a plunger D, having its plunger-rod D' extending through a recessed portion A² of a cap A³, screwing on the upper end of the vessel A with a view to close the same.

A spring E is coiled around the plunger D and rests with one end on the top of the plunger D, while the other end of the said spring abuts against the upper end wall of the extension A². By the arrangement described an exceedingly long and powerful spring can be employed to insure a forcing of the plunger D from the top of the vessel A down to the bottom thereof to cause a complete discharge of all the lubricant contained in the vessel A to the part to be lubricated by way of the feed-passage A'. By the use of a powerful spring, as described, lubricant can be successfully forced to distant parts by the use of tubes and to points not readily accessible while the machinery is in motion.

In order to prevent leakage of the lubricant past the plunger D into the upper end of the vessel A, a packing-ring F is provided, preferably made of leather and fitted on the under side of the plunger D. This packing-ring F is engaged on its inner wall by an annular offset or shoulder G' of an expansion disk G, made in sections, as plainly illustrated in Fig. 2, each section being held by a screw H to the plunger D, the screw passing through an elongated slot G² in the respective section to allow the same to slide outward with a view of expanding the ring F—that is, to move the peripheral face thereof into firm contact with the inner wall of the vessel A. In order to move the sections of the disk G simultaneously outward with a view of expanding the packing-ring F, a screw I is provided, screwing in the plunger D and its plunger-rod D', and on said screw I is formed a conical head I', engaging a countersink at the middle of the disk G, so that when the screw I is screwed upward in the plunger D and its plunger-rod D' then the head I' forces the sections of the disk G outward, thereby expanding the ring F.

From the foregoing it will be seen that all wear on the ring F can be readily taken up from time to time by screwing up the screw I, and as the said ring is held in firm contact with the inner surface of the vessel A it is evident that all leakage of lubricant past the said plunger is entirely prevented and all the lubricant in the vessel A is forced to the part to be lubricated by the action of the spring E pressing the plunger D downward.

When it is desired to refill the vessel A with lubricant, it is necessary to move the plunger D upward into an uppermost position and to then unscrew the cap A³ from the vessel A to allow of refilling the same. In order to conveniently move the plunger D upwardly against the tension of its spring E, a nut J is provided, screwing on the upper threaded end D² of the plunger-rod D' outside of the extension A². The nut J is provided with suitable handles adapted to be taken hold of by the operator for conveniently turning the nut on the threaded portion D² at the time the lower side of the nut J rests on the upper end of the extension $A^2$. Thus when the screw is turned the plunger-rod D', and with it the plunger D, is raised from a lowermost position into an uppermost position in the vessel A. After the vessel A is filled and the cap $A^3$ is replaced on the vessel A then the plunger D is released to allow the force of the spring E to move the plunger D downward against the lubricant with a view to force the same out of the feed-passage A'. In order to release the plunger D, the operator screws the nut J upward a desired distance on the upper threaded end of the plunger-rod D'. To prevent the nut J from turning accidentally when in its uppermost position, a slide K is provided, pressed on by a spring L and bearing against the threaded end $D^2$ of the plunger-rod, the said slide K being mounted to slide on the nut J, as plainly illustrated in Fig. 3. It will be noticed from an inspection of Fig. 3 that the nut J is provided with a raised portion $j$, having an undercut groove $j'$ arranged radially to the plunger-rod, and the slide K is provided with a head $k$ for engaging the plunger-rod and with a body portion $k'$, fitting the undercut groove, the spring L being arranged between the head of the slide and the raised portion of the nut. In order to prevent the nut J from being completely unscrewed from the upper end of the plunger-rod D', a cap N is provided, secured to the outer terminal of the plunger-rod by a transverse pin N'. (See Fig. 1.)

Having thus described my invention, I claim as new and desire to secure by Letters Patent—

A lubricator comprising a vessel for containing a lubricant and provided with a feed-passage for the discharge of the lubricant from the vessel, a spring-pressed plunger provided with a plunger-rod extending without the vessel, a handled nut screwing on the said extended portion of the plunger-rod, said nut having a raised portion provided with a radial groove having undercut edges, a retainer having a head for engaging the plunger-rod, and a body portion fitting in the groove, and a spring between the head and the raised portion.

In testimony whereof I have signed my name to this specification in the presence of two subscribing witnesses.

GEORGE SLOAN.

Witnesses:
C. E. FORSYTH,
AMIE L. MOOK.